Figure 1:
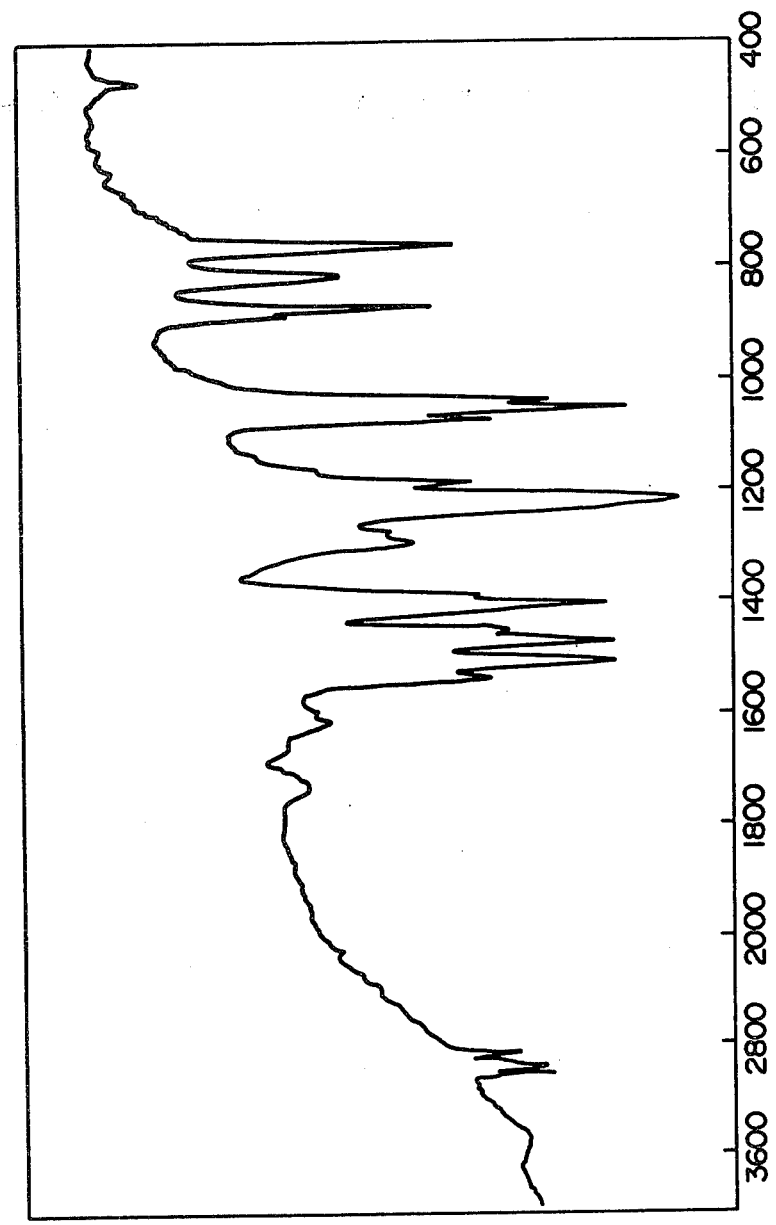

United States Patent [19]

Teshirogi

[11] 4,434,285
[45] Feb. 28, 1984

[54] POLYPHENYLENE-TYPE POLYMERIC COMPOUND AND PROCESS FOR PRODUCTION THEREOF

[75] Inventor: Takuma Teshirogi, Yonezawa, Japan

[73] Assignee: Dainippon Ink and Chemicals, Inc., Tokyo, Japan

[21] Appl. No.: 416,480

[22] Filed: Sep. 10, 1982

[30] Foreign Application Priority Data

Sep. 14, 1981 [JP] Japan .................................. 56-144026

[51] Int. Cl.$^3$ ....................... C08G 61/10; C08G 61/12
[52] U.S. Cl. ........................................ 528/86; 528/219
[58] Field of Search .................................. 528/219, 86

[56] References Cited

U.S. PATENT DOCUMENTS 3,405,091 10/1968 Sprengling et al. ................... 528/86
3,576,788 4/1971 Harris et al. ........................... 528/219

OTHER PUBLICATIONS

*Synthesis of Polyphenylene Derivatives*, Ragimov et al., Polymer Science, USSR, vol. 15, No. 7, pp. 1632–1636, (1973).

*Primary Examiner*—Lester L. Lee
*Attorney, Agent, or Firm*—Sherman & Shalloway

[57] ABSTRACT

Poly(dimethoxyphenylene) composed of recurring structural units of the formula

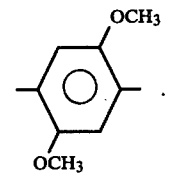

The aforesaid compound can be prepared by polymerizing p-dimethoxybenzene in an inert solvent in the presence of a Lewis acid and an oxidant under reduced pressure.

7 Claims, 3 Drawing Figures

POLYPHENYLENE-TYPE POLYMERIC COMPOUND AND PROCESS FOR PRODUCTION THEREOF

This invention relates to poly(dimethoxyphenylene), a novel compound, and a process for its production.

Polyphenylene composed of recurring structural units

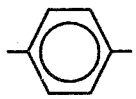

has previously been known as a polymeric compound in which phenylene groups are linked in a straight chain. Since polyphenylene has a decomposition temperature of 550° C. and thus exhibits excellent heat resistance, it is expected to be used as a metal substitute in the field of aerospace materials and engineering plastics. But because of its infusibility and insolubility, it has poor processability, and has not been fully utilized by taking advantage of its characteristics as polymer.

It is an object of this invention therefore to provide a new polymeric material having excellent heat resistance and being free from the processability defect of conventional polyphenylene polymers.

As a polymeric material meeting this object, the present invention provides poly(dimethoxyphenylene) composed of recurring structural units of the formula:

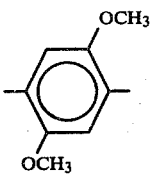

The present invention also provides a process for producing the aforesaid poly(dimethoxyphenylene), which comprises polymerizing p-dimethoxybenzene in an inert solvent in the presence of a Lewis acid and an oxidant under reduced pressure to induce oxidative condensation of p-dimethoxybenzene.

An attempt at obtaining a polymeric compound by the oxidative condensation of dimethoxybenzene is reported in Polymer Science U.S.S.R., Vol. 15, No. 7, 1632-1636 (1973). According to this article, however, pure high-molecular-weight poly(dimethoxphenylene) was not obtained. The polymers described in this article are either a polymer having a high softening point (360° C.) in which at least 6% of the methoxy groups on the phenylene nucleus are converted to hydroxyl groups by hydrolysis, or a polymer which has a low molecular weight, a softening point of 170° C., a decomposition point in the air of 170° C., and poor solvent resistance and therefore exhibits only a low practical value as a polymeric material. In contrast, according to the process of this invention, there can be obtained pure high-molecular-weight poly(dimethoxyphenylene) useful as a polymeric material.

It has been known that in the synthesis of polyphenylene from benzene as a starting material, an increase in reaction temperature results in the increased introduction of a halogen atom attributed to the catalyst into the aromatic rings. The present inventor has found that in order to prevent introduction of halogen in the synthesis of poly(dimethoxyphenylene) from dimethoxybenzene, it is necessary not only to inhibit the increase of the reaction temperature, but also to remove hydrogen chloride, hydrogen bromide and other gaseous by-products generated from the reaction system by such means as the reduction of the pressure of the reaction system. The reaction under reduced pressure also makes it possible to prevent the cleavage of the C—O bonds in the methoxy groups (i.e. the hydrolysis of the methoxy groups). Consequently, the poly(dimethoxyphenylene) of this invention has no hydroxyl group on the phenylene rings in the polymer chain and retains all of the methoxy groups of the monomer, and therefore exhibits very advantageous properties as a polymeric material.

The poly(dimethoxyphenylene) of this invention has a softening point of 350° C. and a decomposition point, in the air, of 560° C., and because of this, has heat melt moldability not seen in hydroxyl-containing poly(dimethoxybenzene) or polyphenylene.

The poly(dimethoxyphenylene) of this invention is difficultly soluble, and dissolves only slightly in concentrated sulfuric acid while not dissolving in most solvents. It is extremely difficult therefore to determine its molecular weight and degree of polymerization. Its intrinsic viscosity [$\eta$] can, however, be determined from its viscosity in conc. sulfuric acid. The intrinsic viscosity of the polymer of this invention so determined is usually between 0.02 and 0.2 although varying depending upon the conditions for polymer formation.

In its infrared absorption spectrum, the poly(dimethoxyphenylene) of this invention has no absorption at about 3400 cm$^{-1}$. It is clear from this that no phenolic hydroxyl group occurs either during the reaction or during after-treatment. This observation on the results of analysis of the infrared absorption spectrum is supported by the fact that when it is assumed that the recurring units of the poly(dimethoxyphenylene) of this invention are represented by $C_8H_8O_2$, the calculated values in elemental analysis (C:70.57%, H:5.92%) agree well with the actually found values (C:70.44%, H:5.88%). Furthermore, no chlorine atom is detected in the elemental analysis. This leads to the determination that there takes place no introduction of a chlorine atom of the catalyst into the phenylene rings, which is an anticipated side-reaction during the formation of poly(dimethoxyphenylene).

p-Dimethoxybenzene, a starting material for the production of the poly(dimethoxyphenylene) of this invention, can be easily obtained by methylating hydroquinone with dimethyl sulfate.

The polymerization reaction of dimethoxybenzene for the production of the poly(dimethoxyphenylene) of this invention is considered to be an oxidative condensation through a cation radical as an intermediate as in the polymerization of benzene, and is carried out in an inert solvent in the presence of a Lewis acid and an oxidant.

Lewis acids used in cationic polymerization or coordination polymerization can be suitably used in the process of this invention. Examples include anhydrous aluminum chloride, anhydrous ferric chloride, anhydrous titanium (IV) chloride, anhydrous stannic chloride, anhydrous molybdenum chloride, anhydrous tungsten chloride, anhydrous antimony (V) chloride, boron fluoride and boron fluoride etherate. Anhydrous aluminum chloride and anhydrous ferric chloride are especially preferred. The corresponding other halides may also be used.

Since the reaction of forming the polymer of this invention proceeds oxidatively, it needs to be carried out in the presence of an oxidant. If, however, the Lewis acid used in the reaction has a sufficient oxidizing power and its amount is sufficient, the additional use of an oxidant is not always necessary.

Examples of suitable oxidant include compounds of transition metals having a high atomic valence (for example, chlorides such as anhydrous cupric chloride, hydrous cupric chloride, ferric chloride, stannic chloride, molybdenum chloride and tungsten chloride, the corresponding other halides, oxides such as manganese dioxide, lead dioxide and stannic oxide, and oxo acid salts such as permanganates); organic oxidizing agents such as chloranil, benzoquinone and naphthoquinone; organic peracids such as peracetic acid, perbenzoic acid and m-chloroperbenzoic acid; and hydrogen peroxide. Of these, anhydrous cupric chloride, hydrous cupric chloride, and anhydrous ferric chloride are preferred. If as in the case of cupric chloride, the oxidizing agent has a low solubility in the reaction solvent and does not exhibit a sufficient effect, it is effective to utilize oxygen in the air or use a catalyst promoter together. Examples of such a promoter are cobalt salts including carboxylates such as cobalt acetate and cobalt complexes such as cobalt acetylacetonate.

Organic solvents inert to aryl cations used in ordinary Friedel-Crafts reactions may be used as the inert solvent in the process of this invention. Nitroalkanes such as nitromethane and nitroethane, nitrobenzene, and o-dichlorobenzene are preferred. The amount of the inert solvent used may be one sufficient to dissolve the starting dimethoxybenzene, and preferably the Lewis acid as well. Usually, it is 1 to 20 parts by weight per part by weight of the dimethoxybenzene.

The amount of the Lewis acid used is determined by its activity or its solubility in solvents. Usually, it is 1 to 5 moles per mole of the dimethoxybenzene. For example, when aluminum chloride is used as the Lewis acid, 1 mole of aluminum chloride will give a good yield. But in the case of using titanium chloride or ferric chloride, it is desirably used in an amount of 2 to 2.5 moles.

The oxidizing agent needs to be used in an amount of at least two equivalents per mole of dimethoxybenzene. For example, when ferric chloride or cupric chloride is used as the oxidizing agent, it must be used in an amount of 2 moles.

Since cupric chloride has a low solubility in solvents, its amount should desirably be increased. In order to complete the reaction in a shorter period of time, it is effective to use an increased amount of ferric chloride which is easily soluble in the solvent. The increase of the amount of the oxidant is determined mainly for operative or economic reasons, but generally, the amount is increased up to 5 equivalents.

The pressure condition for removing the hydrogen halides generated in the practice of the process of this invention is 1 to 100 mmHg. As the pressure approaches normal atmospheric pressure, substitution of halogen on the aromatic ring and cleavage of the C—O bonds in the methoxy groups tend to take place more readily. There is no particular change in effect, however, even if the pressure is below 1 mmHg. From the viewpoint of operation, pressures of 10 to 40 mmHg are usually suitable.

In the process of this invention, the increasing of the reaction temperature is not advantageous because it will cause the halogenation of the aromatic ring or the cleavage of the C—O bonds in the methoxy groups. On the other hand, if the reaction is carried out at too low a temperature, the solubility of dimethoxybenzene in the solvent is reduced, and the rate of the reaction is retarded. Accordingly, although the reaction can be carried out at a temperature between −30° C. and 100° C., it is operationally most advantageous to carry it out at a temperature between 0° and 40° C., especially at room temperature and in its vicinity.

The reaction time, which is the time required until the generation of hydrogen halide gases is no longer observed and the reaction is considered to be completed, is 30 minutes to 2 hours.

The poly(dimethoxyphenylene) of this invention has much better melt-moldability and heat resistance than known polyphenylene-type polymeric compounds, and are very useful as various molding materials. The poly(dimethoxyphenylene) of this invention is also useful as an organic electrically conductive material since when doped with iodine or arsenic pentafluoride, it has an increased electric conductivity.

The following examples illustrate the polymeric compound and the process for its production in accordance with this invention.

EXAMPLE 1

Pulverized anhydrous aluminum chloride (13.4 g) and 17.1 g of hydrous cupric chloride were stirred vigorously in 100 ml of nitrobenzene, and under a reduced pressure of 20 mmHg, 13.8 g of p-dimethoxybenzene in 50 ml of nitrobenzene was added. The mixture was maintained at room temperature for 30 minutes. The resultant mixture was added to 100 ml of 6N hydrochloric acid, and the mixture was stirred. The insoluble materials were separated by filtration, and washed repeatedly with large amounts of hexane, dilute hydrochloric acid, a 0.2N aqueous solution of sodium hydroxide and distilled water, and dried at 100° C. for 8 hours to give 2.9 g of a brown polymer.

The infrared absorption spectrum of the resulting polymer is shown in FIG. 1.

In elemental analysis, the found values were C:70.44%, H:5.88% which corresponded very well with the calculated values (C:70.57%, H:5.92%) obtained on the assumption that the recurring units of the polymer were $C_8H_8O_2$. No chlorine was detected in the elemental analysis.

The polymer had a softening point of 325° C. In the thermogravimetric analysis carried out in air at a temperature raising rate of 10° C./min., a weight loss of 5% occured at 325° C., and a weight loss of 50% occurred at 500° C.

The polymer was found to have an intrinsic viscosity of 0.070. The intrinsic viscosity was determined by measuring its inherent viscosity at 37° C. for its solution in conc. sulfuric acid in a concentration (c) of from 0.05 to 0.7 g/100 ml, and extrapolating the curve of the inherent viscosity to c=0.

The polymer had a solubility of 23% in acetone and 30% in dimethylformamide.

EXAMPLE 2

The same polymerization reaction and work-up as in Example 1 were carried out except that 13.5 g of anhydrous cupric chloride was used instead of 17.1 g of hydrous cupric chloride.

The infrared absorption spectrum of the resulting polymer corresponded with that of the polymer obtained in Example 1. The elemental analysis values as found were C:70.33%, H:5.86%, which agreed very well with the calculated values for $C_8H_8O_2$. No chlorine was detected in the elemental analysis. The polymer was found to have an intrinsic viscosity, determined from the measurement of its viscosity in conc. sulfuric acid, of 0.066.

EXAMPLE 3

Pulverized aluminum chloride (13.4 g), 13.5 g of cupric chloride and 1.25 g of cobalt acetate tetrahydrate were vigorously stirred in 100 ml of nitrobenzene, and while blowing dry air into the mixture through a capillary, the pressure was maintained at 25 to 35 mmHg and 13.8 g of p-dimethoxybenzene in 50 ml of nitrobenzene was added. The mixture was maintained at room temperature for 30 minutes. The reaction mixture was added to 100 ml of 6N hydrochloric acid, and the mixture was stirred. The insoluble materials were collected by filtration, washed with large amounts of hexane, 2N hydrochloric acid, a 0.2N aqueous solution of sodium hydroxide and water, and dried at 100° C. for 8 hours under reduced pressure to give 6.7 g of a pale brown polymer.

Figure 2:
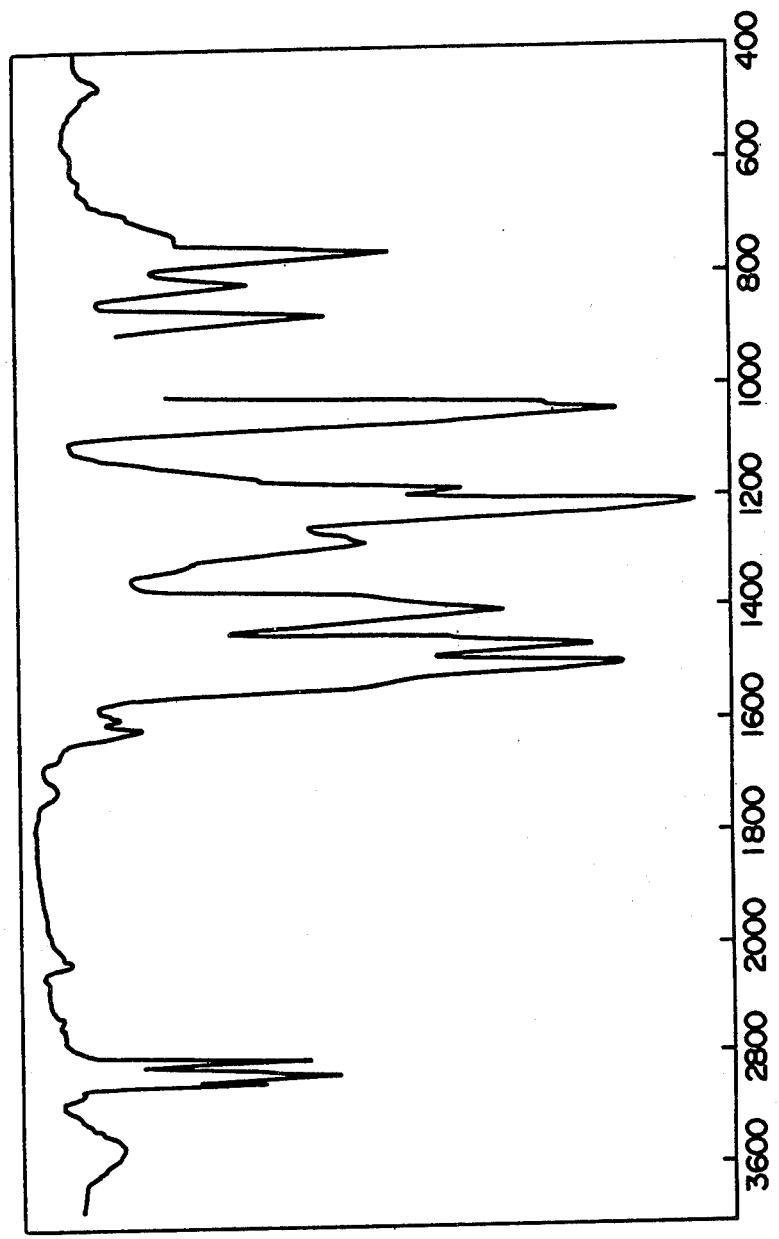

The infrared absorption spectrum of the resulting polymer is shown in FIG. 2. It is observed from it that a slight amount of hydroxyl groups formed.

The elemental analysis values of the polymer were C:69.48%, H:5.96%.

Thermogravimetric analysis showed that a weight loss of 5% occured at 320° C., and a weight loss of 50% occured at 500° C., showing no great difference from the results obtained in Example 1.

EXAMPLE 4

A brown polymer was prepared in an amount of 4.3 g by operating in the same way as in Example 1 except that 32.5 g of ferric chloride was used instead of 13.4 g of aluminum chloride and 17.1 g of hydrous cupric chloride (Lewis acid and oxidant).

The elemental analysis values of the polymer were C:68.7%, H:6.05%.

EXAMPLE 5

A brown polymer was prepared in an amount of 3.1 g by operating in the same way in Example 1 except that o-dichlorobenzene was used instead of nitrobenzene (solvent).

The elemental analysis values of the polymer were C:67.22%, H:6.18%. The polymer had a softening point of 290° C., and a solubility of 85% in acetone, and 95% in dimethyl formamide.

EXAMPLE 6

A solution of 40 g of anhydrous ferric chloride in 50 ml of nitromethane was placed under a reduced pressure of 20 mmHg, and 13.8 g of p-dimethoxybenzene in 120 ml of nitromethane was carefully added at room temperature so that the temperature of the mixture did not exceed 40° C. After the addition the mixture was stirred at room temperature for 2 hours under a reduced pressure of 20 mmHg. The reaction mixture was added to 300 ml of methanol at room temperature, and the mixture was stirred for 1 hour. The insoluble materials were collected by filtration, washed repeatedly with 2N hydrochloric acid, and dried in vacuum at 100° C. for 6 hours to give 9.2 g of a pale brown polymer.

The elemental analysis values of the resulting polymer were C:70.14%, H:5.90%, which agreed well with the calculated values. Thermogravimetric analysis showed that a weight loss of 5% occurred at 320° C., and a weight loss of 50% occurred at 550° C. The polymer was found to have an intrinsic viscosity $[\eta]$ of 0.17.

EXAMPLE 7

A pale brown polymer was prepared in an amount of 11.4 g by operating in the same way as in Example 6 except that nitroisopropane was used instead of nitromethane used as a solvent in Example 6.

Figure 3:
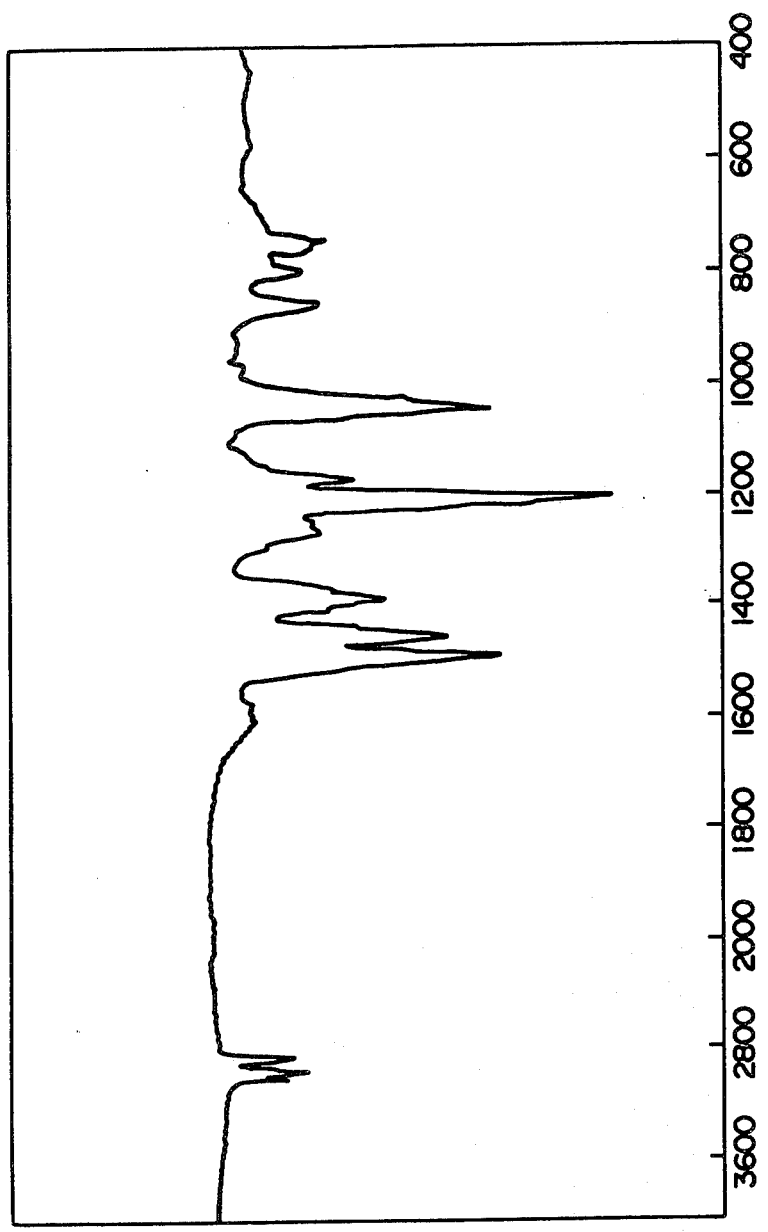

The infrared absorption spectrum of the resulting polymer is shown in FIG. 3. The elemental analysis values of the polymer were C:70.29%, H:5.85%, which corresponded well with the calculated values.

The polymer had a softening point of 350° C. Thermogravimetric analysis showed that a weight loss of 5% occurred at 320° C., and a weight loss of 50% occurred at 550° C. The polymer had an intrinsic viscosity $[\eta]$ of 0.20, and a solubility of 10% in acetone and 13% in dimethylformamide.

Comparative Example

This comparative run illustrates the case in which reduced pressures were not applied during the polymerization of p-dimethoxybenzene.

13.8 g of p-dimethoxybenzene, 13.4 g of well pulverized aluminum chloride and 6.7 g of anhydrous cupric chloride were mixed in 150 ml of nitrobenzene under ice cooling, and then the mixture was maintained at 35° C. for 2 hours. The reaction mixture in the reactor was poured into 300 ml of methanol. The insoluble materials were collected by filtration, well washed repeated with 2N hydrochloric acid, water, a 0.2N aqueous solution of sodium hydroxide and methanol, and dried in vacuum at 100° C. for 6 hours to give 4.5 g of a deep brown powdery polymer.

The elemental analysis values of the resultant polymer were C:68.26%, H:5.61% which did not correspond with the calculated values obtained by assuming the recurring units to be $C_8H_8O_2$. The polymer was found to contain 5.82% of chlorine atoms.

The data in the foregoing examples are summarized in the following table.

| Example | Solvent | Lewis acid (moles) | Oxidizing agent (moles) | Promoter | Amount (g) of the polymer (yield, %) | Elemental analysis C % Found (Calcd.) | H % Found (Calcd.) | TGA 5% 50% | $[\eta]$ SP |
|---|---|---|---|---|---|---|---|---|---|
| 1 | Nitrobenzene | Aluminum chloride (0.1) | Cupric chloride dihydrate (0.1) | — | 2.9 (21.3%) | 70.44 (70.57) | 5.88 (5.92) | 325 500 | 0.070 |

-continued

| Example | Solvent | Lewis acid (moles) | Oxidizing agent (moles) | Promoter | Amount (g) of the polymer (yield, %) | C % Found (Calcd.) | H % Found (Calcd.) | TGA 5% 50% | [η] SP |
|---|---|---|---|---|---|---|---|---|---|
| 2 | Nitrobenzene | Aluminum chloride (0.1) | Cupric chloride (0.1) | — | 4.6 (33.8%) | 70.33 | 5.86 | 330 500 | 0.066 |
| 3 | Nitrobenzene | Aluminum chloride (0.1) | Cupric chloride (0.1) | Cobalt acetate | 6.7 (49.3%) | 69.48 | 5.96 | 320 500 | 0.07 |
| 4 | Nitrobenzene | | Ferric chloride (0.2) | — | 4.3 (31.4%) | 68.74 | 6.05 | 260 420 | 0.024 |
| 5 | Dichlorobenzene | Aluminum chloride (0.1) | Cupric chloride (0.1) | — | 3.1 (22.8%) | 67.22 | 6.18 | 240 350 | 0.02 |
| 6 | Nitromethane | | Ferric chloride (0.25) | — | 9.2 (67.4%) | 70.14 | 5.90 | 320 550 | 0.17 |
| 7 | Nitroisopropane | | Ferric chloride (0.25) | — | 11.4 (83.8%) | 70.29 | 5.85 | 320 550 | 0.20 |
| Comp. Example | Nitrobenzene | Aluminum chloride (0.1) | Cupric chloride (0.05) | — | 4.5 (33.0%) | 68.26 Cl: 5.82 | 5.61 | 320 480 | 0.06 |

What is claimed is:

1. Poly(dimethoxyphenylene) composed of recurring structural units of the formula

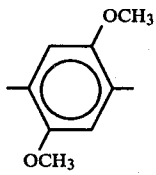

2. The polymer of claim 1 which has an intrinsic viscosity ($\eta$) of 0.02 to 0.2, said intrinsic viscosity being determined by measuring its inherent viscosity at 37° C. for its solution in concentrated sulfuric acid in a concentration (c) of from 0.05 to 0.7 g/100 ml, and extrapolating the curve of the inherent viscosity to c=0.

3. A process for producing poly(dimethoxyphenylene) which has an inherent viscosity of 0.02 to 0.2, which comprises polymerizing p-dimethoxybenzene in an inert solvent in the presence of a Lewis acid and an oxidant under reduced pressure, said intrinsic viscosity being determined by measuring its inherent viscosity at 37° C. for its solution in concentrated sulfuric acid in a concentration (c) of from 0.05 to 0.7 g/100 ml, and extrapolating the curve of the inherent viscosity to c=0.

4. The process of claim 3 wherein nitrobenzene is used as the inert solvent, anhydrous aluminum chloride is used as the Lewis acid, and anhydrous or hydrous cupric chloride is used as the oxidant.

5. The process of claim 3 wherein a nitroalkane is used as the inert solvent and anhydrous ferric chloride is used both as the Lewis acid and the oxidant.

6. The process of claim 3 wherein the polymerization is carried out at a temperature of from −30° C. to 100° C. at a pressure of 1 to 100 mmHg for a period of from 30 minutes to 2 hours.

7. The process of claim 3 wherein the polymerization is carried out at a temperature of from about 0° C. to about 40° C. and at a pressure of from about 10 to 40 mmHg.

* * * * *